US009158299B2

United States Patent
Kouno et al.

(10) Patent No.: US 9,158,299 B2
(45) Date of Patent: Oct. 13, 2015

(54) ROBOT SYSTEM AND METHOD FOR PRODUCING TO-BE-WORKED MATERIAL

(71) Applicant: KABUSHIKI KAISHA YASKAWA DENKI, Kitakyushu-shi (JP)

(72) Inventors: Dai Kouno, Kitakyushu (JP); Tamio Nakamura, Kitakyushu (JP); Tetsuro Izumi, Kitakyushu (JP); Ryoichi Nagai, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/191,431

(22) Filed: Feb. 27, 2014

(65) Prior Publication Data

US 2014/0277713 A1    Sep. 18, 2014

(30) Foreign Application Priority Data

Mar. 15, 2013  (JP) .................................. 2013-053293

(51) Int. Cl.
*B23Q 3/155* (2006.01)
*G05B 19/418* (2006.01)
*B25J 9/16* (2006.01)
(Continued)

(52) U.S. Cl.
CPC ......... *G05B 19/41815* (2013.01); *B25J 9/0084* (2013.01); *B25J 9/1682* (2013.01); *B25J 21/00* (2013.01); *G05B 2219/31075* (2013.01)

(58) Field of Classification Search
CPC ........ B25J 9/0084; B25J 9/026; B23Q 7/046; B23Q 7/043; G05B 2219/40292

USPC ........... 700/245–264; 701/23, 28; 318/568.1, 318/568.11, 568.12, 568.16, 575, 567, 566, 318/560
See application file for complete search history.

(56) References Cited

U.S. PATENT DOCUMENTS

| | | | | |
|---|---|---|---|---|
| 4,940,925 A | * | 7/1990 | Wand et al. ..................... | 318/587 |
| 7,114,157 B2 | * | 9/2006 | Chaffee et al. ................ | 718/104 |

(Continued)

FOREIGN PATENT DOCUMENTS

| | | |
|---|---|---|
| JP | 2006-167854 | 6/2006 |
| JP | 2008-229738 | 10/2008 |

(Continued)

OTHER PUBLICATIONS

Extended European Search Report for corresponding EP Application No. 14157560.5-1807, May 18, 2015.

(Continued)

*Primary Examiner* — Dalena Tran
(74) *Attorney, Agent, or Firm* — Mori & Ward, LLP

(57) ABSTRACT

A robot system includes a first cell and a second cell. The first cell includes a first robot, a first controller, and a first casing. The first robot performs work on a to-be-worked material. The first controller controls the first robot. The first casing accommodates the first robot and the first controller. The second cell includes a second robot, a second controller, and a second casing. The second robot performs work on a to-be-worked material. The second controller controls the second robot. The second casing accommodates the second robot and the second controller. When the first casing and the second casing are connected to each other, the first controller and the second controller respectively control the first robot and the second robot to work in a common operation area, where a first movable area and a second movable area overlap.

20 Claims, 4 Drawing Sheets

(51) Int. Cl.
 *B25J 9/00* (2006.01)
 *B25J 21/00* (2006.01)

(56) References Cited

U.S. PATENT DOCUMENTS

| | | | |
|---|---|---|---|
| 8,315,738 B2 * | 11/2012 | Chang et al. | 700/255 |
| 2003/0100957 A1 | 5/2003 | Chaffee et al. | |
| 2013/0055560 A1 * | 3/2013 | Nakasugi et al. | 29/700 |

FOREIGN PATENT DOCUMENTS

| | | |
|---|---|---|
| JP | 2009-148869 | 7/2009 |
| JP | 2010-105105 | 5/2010 |
| JP | 2010-137339 | 6/2010 |
| JP | 2012-086333 | 5/2012 |
| WO | 2012/002405 | 1/2012 |

OTHER PUBLICATIONS

Japanese Office Action for corresponding JP Application No. 2013-053293, Sep. 30, 2014.

Chinese Office Action for corresponding CN Application No. 201410042256.9, Jun. 30, 2015

* cited by examiner

ROBOT SYSTEM AND METHOD FOR PRODUCING TO-BE-WORKED MATERIAL

CROSS-REFERENCE TO RELATED APPLICATIONS

The present application claims priority under 35 U.S.C. §119 to Japanese Patent Application No. 2013-053293, filed Mar. 15, 2013. The contents of this application are incorporated herein by reference in their entirety.

BACKGROUND

1. Field of the Invention

The present invention relates to a robot system and a method for producing a to-be-worked material, 2. Discussion of the Background Japanese Unexamined Patent Application Publication No. 2009-148869, Japanese Unexamined Patent Application Publication No. 2010-105105, and Japanese Unexamined Patent Application Publication No. 2010-137339 disclose that a box-shaped casing and a single cell accommodated in the box-shaped casing constitute one cell.

SUMMARY

According to one aspect of the present disclosure, a robot system includes a first cell and a second cell. The first cell includes a first robot, a first controller, and a first casing. The first robot is configured to perform a predetermined kind of work on a to-be-worked material within a first movable area. The first controller is configured to control the first robot. The first casing accommodates the first robot and the first controller. The second cell includes a second robot, a second controller, and a second casing. The second robot is configured to perform a predetermined kind of work on a to-be-worked material within a second movable area. The second controller is configured to control the second robot. The second casing accommodates the second robot and the second controller, and is connectable to the first casing. When the first casing and the second casing are connected to each other, the first controller and the second controller are configured to respectively control the first robot and the second robot to work in a common operation area. The common operation area is where the first movable area and the second movable area overlap.

According to another aspect of the present disclosure, a method is for producing a to-be-worked material using a robot system. The robot system includes a first cell and a second cell. The first cell includes a first robot, a first controller, and a first casing. The first robot is configured to perform a predetermined kind of work on a to-be-worked material within a first movable area. The first controller is configured to control the first robot. The first casing accommodates the first robot and the first controller. The second cell includes a second robot, a second controller, and a second casing. The second robot is configured to perform a predetermined kind of work on the to-be-worked material within a second movable area. The second controller is configured to control the second robot. The second casing accommodates the second robot and the second controller, and is connectable to the first casing. When the first casing and the second casing are connected to each other, the first controller and the second controller are configured to respectively control the first robot and the second robot to work in a common operation area. The common operation area is where the first movable area and the second movable area overlap. The method includes conveying the to-be-worked material into a work area of at least one robot among the first robot and the second robot. The at least one robot among the first robot and the second robot is controlled to perform the predetermined kind of work on the to-be-worked material. After the at least one robot among the first robot and the second robot is controlled to perform the predetermined kind of work on the to-be-worked material, the to-be-worked material is taken out from the work area.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
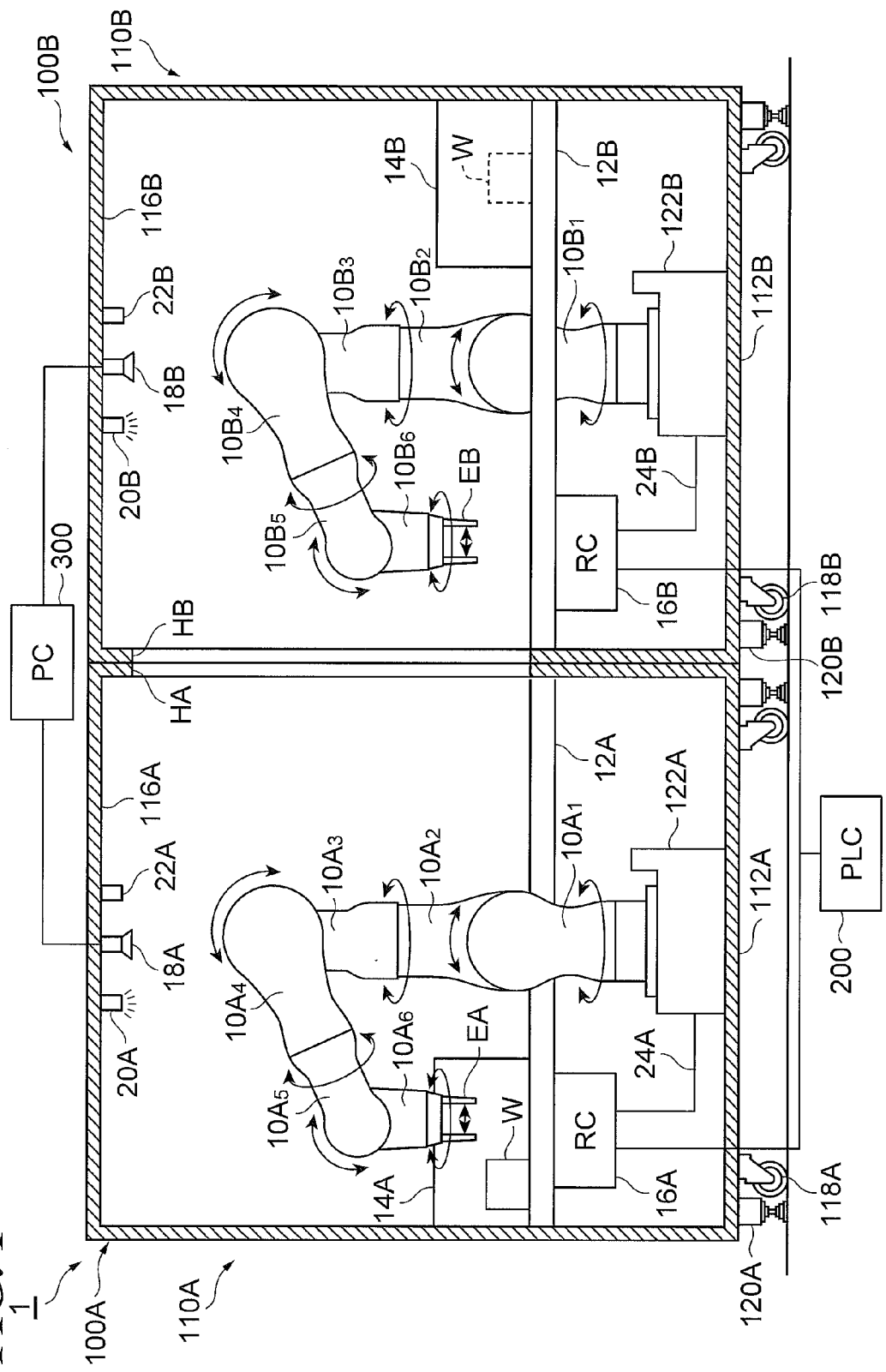
FIG. 1 is a side view of a robot system according to an embodiment.

The embodiments will now be described with reference to the accompanying drawings, wherein like reference numerals designate corresponding or identical elements throughout the various drawings.

In a robot system 1 according to this embodiment, robots 10A and 10B are respectively accommodated in cells 100A and 100B to perform various kinds of work such as processing and assembly on workpieces W (to-be-worked materials). Such a robot system 1 is also referred to as a cell production system. The workpiece W may be any kind of item subject to work such as conveyance and assembly in the robot system 1. The to-be-worked material may be the workpiece W itself, or a product or a semi-processed product made of the workpiece W. The to-be-worked material may also be a product or a semi-processed product formed of a combination of a plurality of parts. The cells 100A and 100B, which respectively accommodate the robots 10A and 10B, are densely arranged in the robot system 1 of this embodiment. This improves the productivity of the workpieces W.

Figure 2:
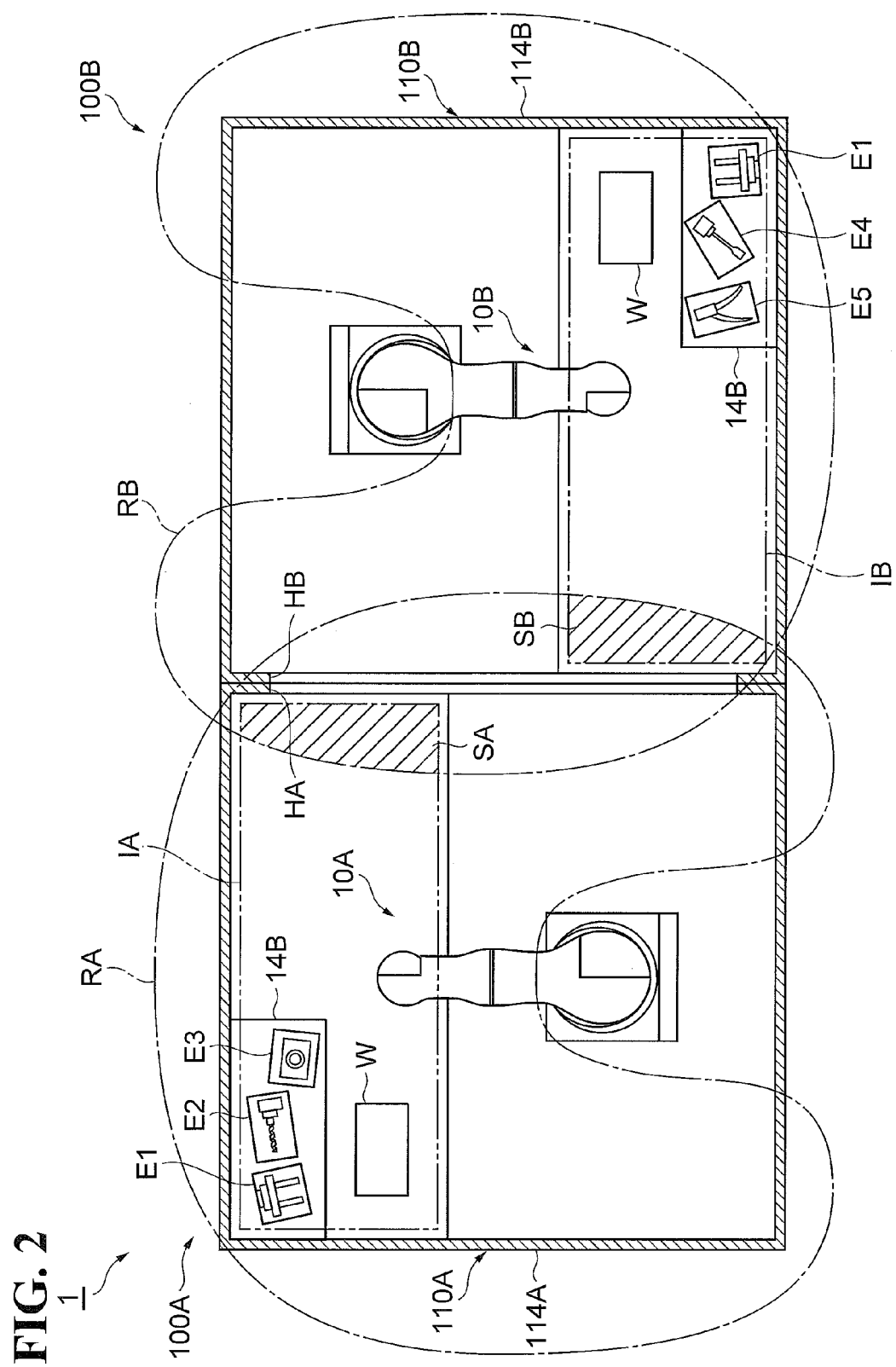
FIG. 2 is a plan view of the robot system according to the embodiment.

As shown in FIGS. 1 and 2, the robot system 1 includes the two cells 100A and 100B, a programmable logic controller (PLC) 200, and a personal computer (PC) 300. While in this embodiment the robot system 1 includes the two cells 100A and 100B adjacent to each other, the robot system 1 may include more than two cells. The cells 100A and 100B have approximately the same configurations. Thus, the following description will be made as to the configuration of the cell 100A, with description of the cell 100B being omitted.

The cell 100A includes the robot 10A and a casing 110A. The robot 10A performs various kinds of work on the workpiece W. The casing 110A accommodates the robot 10A. The casing 110A includes a bottom wall 112A, side walls 114A, and a top wall 116A. The bottom wall 112A has a rectangular shape and supports the robot 10A. The side walls 114A are upright on the respective sides of the bottom wall 112A. The top wall 116A is disposed on the upper ends of the side walls 114A. The robot 10A is accommodated in an accommodation space defined by the bottom wall 112A, the side walls 114A, and the top wall 116A.

On the lower surface of the bottom wall 112A, casters 118A and stoppers 120A are disposed. The casters 118A make the cell 100A movable, and the stoppers 120A fix the cell 100A. One side wall 114A among the side walls 114A that is in contact with the casing 110B of the cell 100B has a communication hole HA. The communication hole HA communicates with a communication hole HB, which is formed on a side wall 114B. Thus, the accommodation spaces of the casings 110A and 110B communicate with each other through the communication holes HA and HB. The communication holes HA and HB are each provided with a door (not shown) that is openable and closable. When the cells 100A and 100B are not connected to each other, the doors close the communication holes HA and HB.

The side wall 114A on the front side of the cell 100A is where the following operation parts, not shown, are collectively disposed: an opening through which the workpiece W is supplied and taken out; a monitor on which to check the work status of the robot; and various gauges and switches. This ensures that the operator only needs to be positioned on the front side of the cell 11 when operating the robot system 1. The side walls 114A and the top wall 116A each may have a window (not shown) on at least a part of side walls 114A and the top wall 116A. The window is made of a material (such as polycarbonate) superior in transparency and impact resistance, and thus enables the operator to check the work status of the robot 10A in the casing 110A through the window.

The cell 100A incorporates a work table 12A, a tool box 14A, a robot controller (RC) 16A, a camera 18A, an illumination device 20A, and a sensor 22A. The workpiece W is to be placed on the work table 12A. On the work table 12A, the robot 10A performs work on the workpiece W. In this embodiment, the work table 12A is disposed closer to one side wall 114A than to the other side walls 114A.

The tool box 14A is disposed on the work table 12A and accommodates tools (end effectors) used by the robot 10A to perform work on the workpiece W. The tools include a hand E1, a drill E2, a portable camera E3, a driver E4, and a rivet E5 (see FIG. 2). The robot controller 16A is coupled to the robot 10A, the camera 18A, the illumination device 20A, the sensor 22A, and the PLC 200, so as to transmit and receive information to and from these elements. In this embodiment, the robot controller 16A is disposed on the lower surface of the work table 12A and is coupled to the robot 10A through a cable harness 24A. The robot 10A and the robot controller 16A may be coupled to each other wirelessly, or the robot 10A may incorporate the robot controller 16A.

The camera 18A is disposed on the top wall 116A, and mainly captures an image of the work table 12A from above. In this embodiment, an imaging area IA of the camera 18A is approximately the same as the area of the upper surface of the work table 12A in plan view (see FIG. 2). The illumination device 20A is disposed on the top wall 116A. The illumination device 20A may be any of various types of light sources. Examples include, but are not limited to, a flash that emits a flash of light, a light bulb, a fluorescent light, and an LED that continuously emit a predetermined amount of light. The sensor 22A is disposed adjacent to the camera 18A on the top wall 116A. The sensor 22A detects the intensity (for example, luminosity, brightness, and luminance) of the light received by the camera 18A.

The robot 10A is also referred to as a manipulator. The robot 10A is disposed on the bottom wall 112A of the casing 110A with a base 122A interposed between the robot 10A and the bottom wall 112A, and disposed by a side of the work table 12A. Thus, the robot 10A is disposed closer to another side wall 114A facing the one side wall 114A. The robot 10A operates based on an operation command output from the robot controller 16A. The operation command is a command as a program to activate the robot or a combination job of programs to activate the robot.

The robot 10A includes first to sixth arms $10A_1$ to $10A_6$. The first arm $10A_1$ is coupled to the base 122A. The first to sixth arms $10A_1$ to $10A_6$ are coupled in series in this order from the based end side (the base 122A). A coupling portion between the base 122A and the first arm $10A_1$, and coupling portions between the adjacent arms $10A_1$ to $10A_6$ function as joints of the robot 10A.

The robot 10A includes a plurality of actuators corresponding to the respective joints. The actuators bring the respective arms $10A_1$ to $10A_6$ into swing movement about the respective joints (see the arrows shown in FIG. 1).

The end effector EA may be a hand removably mounted to the sixth arm $10A_6$, which is at the distal end of the robot 10A. The end effector EA is driven by the actuator incorporated in the sixth arm $10A_6$. When the end effector EA is a hand as shown in FIG. 1, a pair of holder pieces are driven by the actuator to move closer to and away from each other. In this manner, the hand holds the workpiece W, changes the posture of the workpiece W, and conveys the held workpiece W.

The sixth arm $10A_6$ (end effector EA) of the robot 10A has a movable area RA. In plan view (as seen in FIG. 2), the movable area RA is a round cornered rectangular area slightly larger than the cell 100A less an area behind the robot 10A (the area on the side of the robot 10A opposite to the work table 12A). In plan view, the movable area RA includes the entire imaging area IA and a part of the imaging area IB that is adjacent to the cell 100A. Thus, the robot 1 OA is able to operate not only in the imaging area IA of the cell 100A but also in a part SB of the imaging area of the adjacent cell 100B (hereinafter referred to as "common operation area").

The PLC 200 controls the robots 10A and 10B respectively through the robot controllers 16A and 16B to perform various kinds of work such as assembly, joining, and conveying of the workpiece. The PC 300 processes images captured by the cameras 18A and 18B to recognize the position and posture of the workpiece W.

Figure 3:
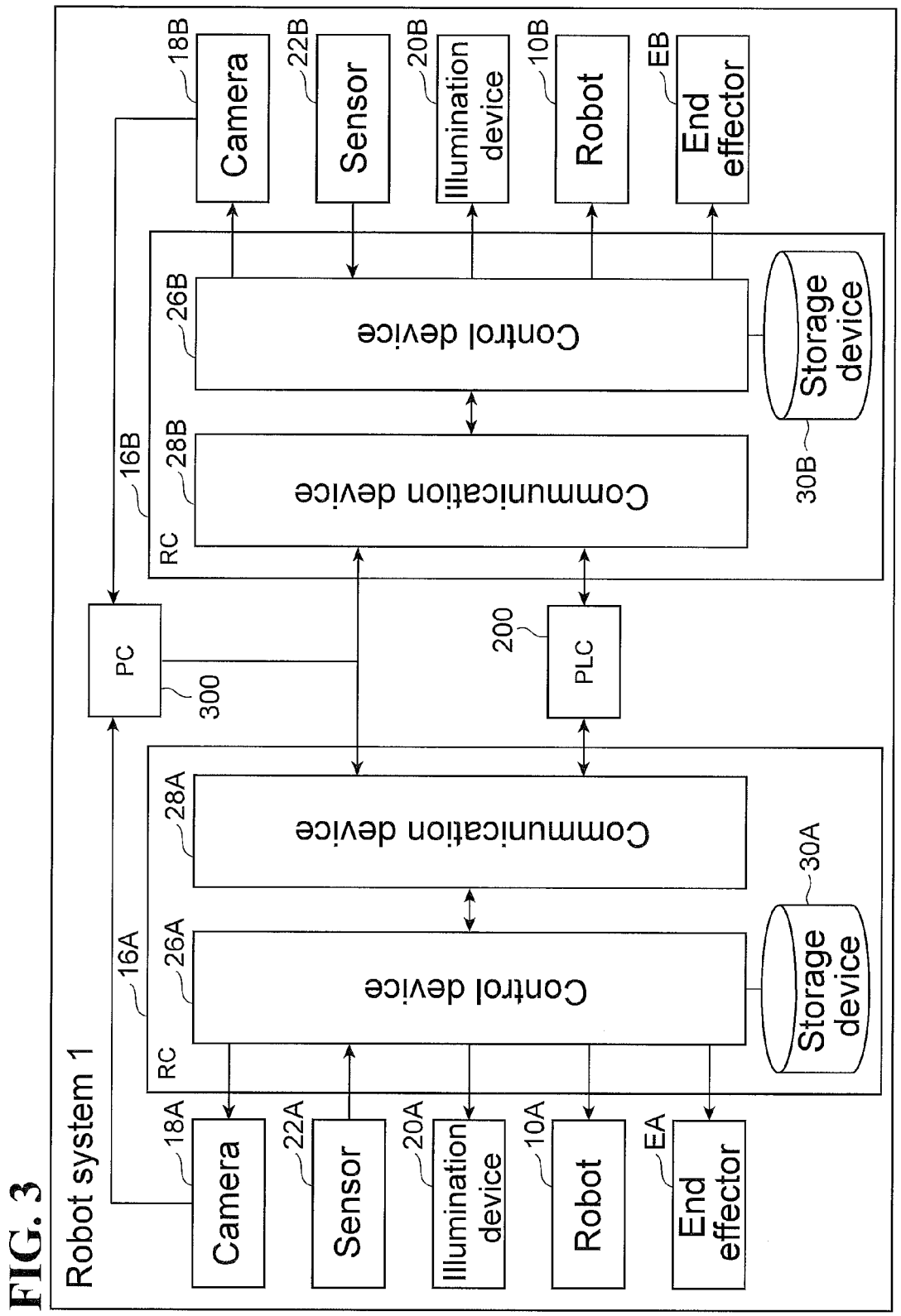
FIG. 3 is a block diagram illustrating the robot system according to the embodiment.

Next, a system configuration of the robot system 1 will be described by referring to FIG. 3. The robot system 1 includes the robot controllers 16A and 16B, the robots 10A and 10B, the end effectors EA and EB, the cameras 18A and 18B, the sensors 22A and 22B, the illumination devices 20A and 20B, the PLC 200, and the PC 300.

The robot controller 16A includes a control device 26A, a communication device 28A, and a storage device 30A. The control device 26A generates an operation command to control the operation of the robot 10A. Specifically, the control device 26A is coupled to the actuators of the robot 10A through the cable harness 24A, and drives the actuators with the operation command, so as to control the operation of the robot 10A.

The control device 26A controls the camera 18A to capture an image of an imaging object (for example, a workpiece W on the work table 12A) that is included in the imaging area IA of the camera 18A. The control device 26A receives the intensity of light detected by the sensor 22A in the form of a signal. The control device 26A controls the illumination device 20A to provide illumination while the camera 18A is capturing the image. In order to enable the camera 18A to receive desired light, the control device 26A controls the intensity of light emitted from the illumination device 20A based on the signal received from the sensor 22A.

Upon receiving a signal from a detection sensor (not shown) that detects that the cells 100A and 100B are connected to each other, the control device 26A determines that the setting has been changed into a connection mode, in which the plurality of cells 100A and 100B are connected. Then, the control device 26A controls the robots 10A, the end effector EA, the camera 18A, and the illumination device 20A to perform operations under connection mode. Examples of the detection sensor include, but are not limited to, a pressure sensor capable of detecting that the side walls 114A and 114B of the cells have come into contact with each other, a sensor that detects an electrical change caused by the contact between the side walls 114A and 114B of the cells, and a sensor that detects a temperature change caused by the contact between the side walls 114A and 114B of the cells. Alternatively, the control device 26A may use a plug-and-play system to change the setting to connection mode in response to the connection between the cables of the cells 100A and 100B. The control device 26A and the cell 100B may be mutually coupled wirelessly.

When the setting is changed into connection mode, the control device 26A opens the doors that have been respectively closing the communication holes HA and HB. This provides communication between the accommodation space of the casing 110A and the accommodation space of the casing 110B, enabling one robot in one casing to use the inside of the other casing. Thus, the work area of each robot is widened.

The communication device 28A communicates with the control device 26A and the PLC 200 to transmit to the other robot controller 16B (control device 26B) a signal indicating that the setting of the control device 26A has been changed into connection mode. The communication device 28A communicates with the control device 26A and the PLC 200 to receive from the other robot controller 16B a signal indicating that the setting of the control device 26B of the other robot controller 16B has been changed into connection mode. The communication devices 28A and 28B may communicate with each other directly, that is, without the intermediation of the PLC 200, which is an upper device of the robot controllers 16A and 16B. The communication between the communication devices 28A and 28B may be wired or wireless.

The storage device 30A stores a command as a program for operating the robot 10A, the end effector EA, the camera 18A, and the illumination device 20A, and stores a job as a set of such programs. The storage device 30A stores information on a tool (end effector EA) accommodated in the cell 100A (tool box 14A). When the control device 26A reads the command or the job from the storage device 30A, then the robot 10A, the end effector EA, the camera 18A, or the illumination device 20A operates in accordance with the read command or job.

The one side wall 114B among the side walls 114B of the cell 100B that is closer to the robot 10B is disposed next to the other side wall 114A of the cell 100A. The side wall 114B among the side walls 114B of the cell 100B that is closer to the work table 12B is disposed next to the one side wall 114A of the cell 100A. Thus, in this embodiment, the robots 10A and 10B are alternately arranged in plan view (see FIG. 2).

Next, description will be made with regard to cooperative operations between the cells 100A and 100B when the settings of the control devices 26A and 26B are changed into connection mode. The following description will be under the assumption that the tool box 14A of the cell 100A accommodates the hand E1, the drill E2, and the portable camera E3 as the end effectors EA. The storage device 30A stores information (tool information) on the end effectors EA (the hand E1, the drill E2, and the portable camera E3 in the example shown in FIG. 2) accommodated in the cell 100A (tool box 14A). The tool box 14B of the cell 100B accommodates the hand E1, the drill E4, and the rivet E5 as the end effectors EB. The storage device 30B stores information (tool information) on the end effectors EB (the hand E1, the driver E4, and the rivet E5 in the example shown in FIG. 2) accommodated in the cell 100B (tool box 14B).

When the settings of the control devices 26A and 26B are changed into connection mode, the control device 26A reads the tool information from the storage device 30A and stores the tool information in the storage device 30B while correlating the tool information to the information on the location (cell 100A). Similarly, the control device 26B reads the tool information from the storage device 30B and stores the tool information in the storage device 30A while correlating the tool information to the information on the location (cell 100B). Thus, the storage devices 30A and 30B each store a table in which the tool information and the location information are correlated. Thus, the cells 100A and 100B share information on the end effectors EA and EB, which are respectively accommodated in the cells 100A and 100B.

Next, when the control device 26A executes the command or the job, the control device 26A determines which of the cells, the cell 100A (tool box 14A) or the cell 100B (tool box 14B), accommodates the end effector EA required for executing the command or the job. Specifically, based on the tool information of the required end effector EA, the control device 26A refers to the table stored in the storage device 30A, and thus acquires the location information. When the required end effector EA is the hand E1, since the hand E1 is accommodated in the cell 100A, which accommodates the control device 26A itself, then the control device 26A controls the robot 10A to mount the hand E1 in the tool box 14A to the robot 10A.

Figure 4:
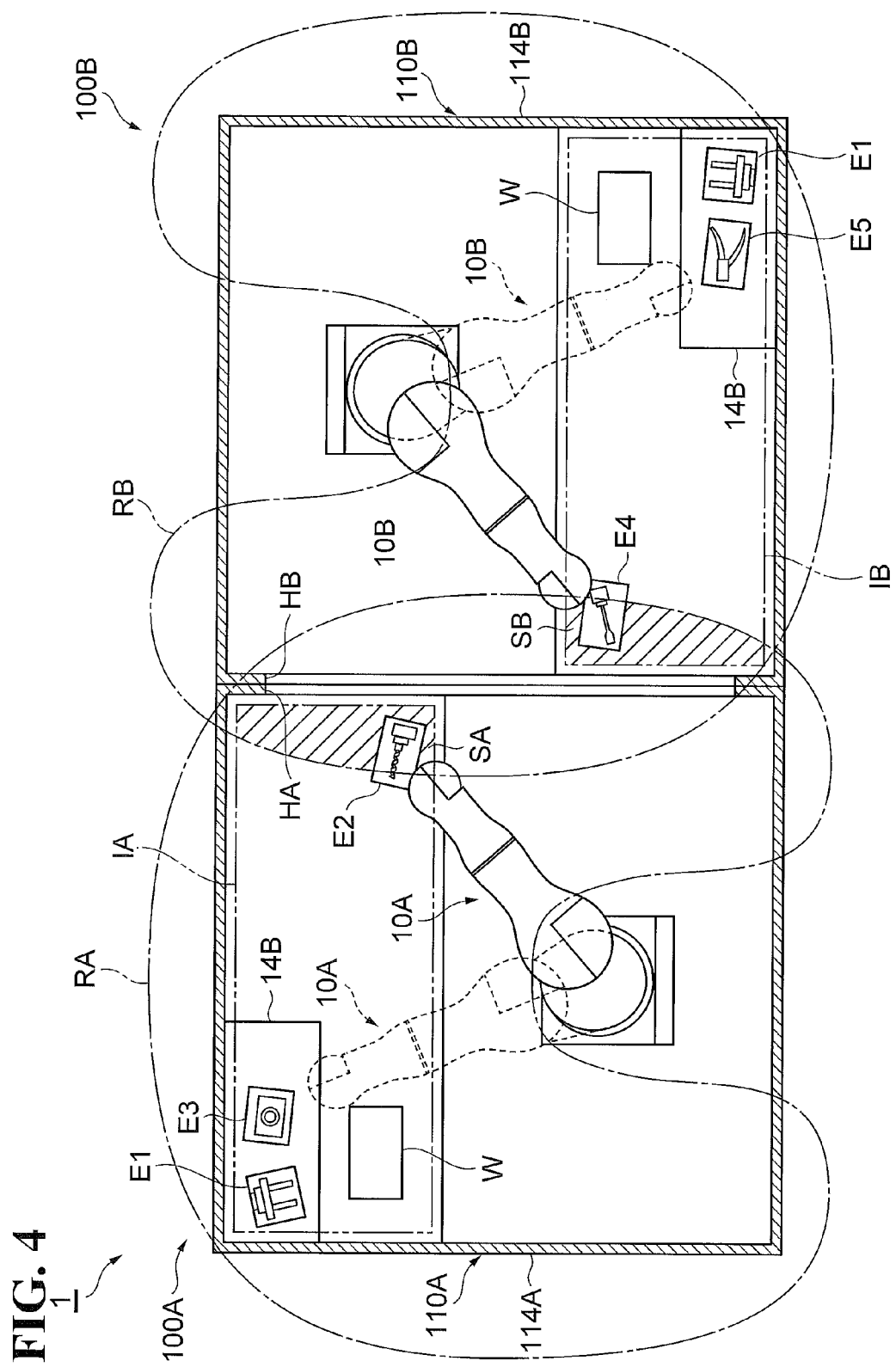
FIG. 4 is a diagram illustrating how to hand over a tool.

When the required end effector EA is the driver E4, since the driver E4 is accommodated in the other cell 100B, the control device 26A transmits a request command for the driver E4 to the control device 26B. Upon receiving the request command, the control device 26B controls the robot 10B to pick the driver E4 out of the tool box 14B and place the driver E4 in the common operation area SA or the common operation area SB (see FIG. 4). Next, the control device 26B transmits to the control device 26A completion information indicating that the placement of the driver E4 is complete. Upon receiving the completion information, the control device 26A controls the robot 1OA to mount the driver E4 placed in the common operation area SA or the common operation area SB to the robot 10A.

When the required end effector EB is not accommodated in the cell 100B, the control device 26B similarly transmits a request command to the control device 26A so as to mount the end effector (drill E2 in the example shown in FIG. 4) in the tool box 14A to the robot 10B.

Next, a method for producing a workpiece W using the above-described robot system will be described. For example, the workpiece W is conveyed into the cell 100A. The workpiece W is then placed on the work table 12A. The camera 18A captures an image of the workpiece W based on an instruction from the control device 26A. After the camera 18A has captured an image of the workpiece W, data of the image is transmitted to the PC 300. The PC 300 processes the image data to recognize the position and posture of the workpiece W imaged by the camera 18A. Then, the PC 300 transmits the recognized position and posture of the workpiece W to the robot controller 16A (communication device 28A). Based on the data on the position and posture of the workpiece W, the control device 26A controls the robot 10A and the end effector EA to perform a predetermined kind of work on the workpiece W. When the work is complete, the workpiece W is taken out of the cell 100A (for example, to the cell 100B). Thus, the workpiece W is produced.

As has been described hereinbefore, in this embodiment, the robots 10A and 10B are controlled to work in the common operation areas SA and SB when the cells 100A and 100B are connected to each other. The common operation areas SA and SB are where the movable areas RA and RB respectively of the robots 10A and 10B overlap. Thus, the robots 10A and 10B are able to work in the common operation areas SA and SB. As a result, the cells 100A and 100B cooperate to work, and this improves operation efficiency.

In this embodiment, the robots 10A and 10B are alternately disposed in plan view (see FIG. 2). This ensures that the robot 10A is able to operate in the common operation area SB, which is a part of the imaging area IB closer to the cell 100A, in addition to the entire imaging area IA. Also, the robot 10B is able to operate in the common operation area SA, which is a part of the imaging area IA closer to the cell 100B, in addition to the entire imaging area IB. Thus, the work area of the robots 10A and 10B are widened.

The above-described embodiment should not be construed in a limiting sense. For example, the tool box 14A of the cell 100A may accommodate a plurality of tools suitable for work on the workpiece W. In this case, the cell 100A functions as a master tool cell. Thus, the other cell 100B may accommodate no tools, and make a request for a required tool to the master tool cell as necessary.

When the settings of the control devices 26A and 26B are changed into connection mode, the cameras 18A and 18B may capture images of a single object from different directions so as to obtain a stereo image (stereoscopic image) of the object. In this case, data of the image of the object captured by each of the cameras 18A and 18B from the different directions is transmitted to the PC 300, and subjected to image processing in the PC 300 into a combined single stereo image.

When the settings of the control devices 26A and 26B are changed into connection mode, the two robots 10A and 10B may perform work on a single workpiece W.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system, comprising:
   a first cell including:
      a first robot configured to perform a predetermined kind of work on a to-be-worked material within a first movable area;
      a first controller configured to control the first robot; and
      a first casing including a first bottom wall, first side walls, and a first top wall, a first accommodation space defined by the first bottom wall, the first side walls, and the first top wall accommodating the first robot and the first controller; and
   a second cell including:
      a second robot configured to perform a predetermined kind of work on a to-be-worked material within a second movable area;
      a second controller configured to control the second robot; and
      a second casing including a second bottom wall, second side walls, and a second top wall, a second accommodation space defined by the second bottom wall, the second side walls, and the second top wall accommodating the second robot and the second controller and being connectable to the first casing,
   wherein when a first wall of the first side walls and a second wall of the second side walls are connected to each other, the first controller and the second controller are configured to respectively control the first robot and the second robot to work in a common operation area, the common operation area being where the first movable area and the second movable area overlap.

2. The robot system according to claim 1,
   wherein the first casing and the second casing each accommodate at least one tool, and
   wherein when the first controller determines that the at least one tool accommodated in the first casing is not a tool to be used by the first robot, the first controller is configured to transmit a request command for the tool to the second controller.

3. The robot system according to claim 2, wherein when the second controller receives the request command, the second controller is configured to control the second robot to pick up the tool and is configured to place the tool in the common operation area.

4. The robot system according to claim 3, wherein the second casing accommodates a plurality of tools suitable for the predetermined kinds of work performed on the to-be-worked material.

5. The robot system according to claim 4, further comprising:
   a first image capture device disposed in the first casing and configured to capture an image of the to-be-worked material in a first imaging area; and
   a second image capture device disposed in the second casing and configured to capture an image of the to-be-worked material in a second imaging area,
   wherein the first controller is configured to control the first robot to work in the imaging area of the first image capture device and in the imaging area of the second image capture device, and
   wherein the second controller is configured to control the second robot to work in the imaging area of the first image capture device and in the imaging area of the second image capture device.

6. The robot system according to claim 5, wherein the first controller is configured to control the first image capture device to capture a stereo image of the to-be-worked material, and the second controller is configured to control the second image capture device to capture another stereo image of the to-be-worked material.

7. The robot system according to claim 3, further comprising:
   a first image capture device disposed in the first casing and configured to capture an image of the to-be-worked material in a first imaging area; and
   a second image capture device disposed in the second casing and configured to capture an image of the to-be-worked material in a second imaging area,
   wherein the first controller is configured to control the first robot to work in the imaging area of the first image capture device and in the imaging area of the second image capture device, and
   wherein the second controller is configured to control the second robot to work in the imaging area of the first image capture device and in the imaging area of the second image capture device.

8. The robot system according to claim 7, wherein the first controller is configured to control the first image capture device to capture a stereo image of the to-be-worked material, and the second controller is configured to control the second image capture device to capture another stereo image of the to-be-worked material.

9. The robot system according to claim 2, wherein the second casing accommodates a plurality of tools suitable for the predetermined kinds of work performed on the to-be-worked material.

10. The robot system according to claim 9, further comprising:
a first image capture device disposed in the first casing and configured to capture an image of the to-be-worked material in a first imaging area; and
a second image capture device disposed in the second casing and configured to capture an image of the to-be-worked material in a second imaging area,
wherein the first controller is configured to control the first robot to work in the imaging area of the first image capture device and in the imaging area of the second image capture device, and
wherein the second controller is configured to control the second robot to work in the imaging area of the first image capture device and in the imaging area of the second image capture device.

11. The robot system according to claim 10, wherein the first controller is configured to control the first image capture device to capture a stereo image of the to-be-worked material, and the second controller is configured to control the second image capture device to capture another stereo image of the to-be-worked material.

12. The robot system according to claim 2, further comprising:
a first image capture device disposed in the first casing and configured to capture an image of the to-be-worked material in a first imaging area; and
a second image capture device disposed in the second casing and configured to capture an image of the to-be-worked material in a second imaging area,
wherein the first controller is configured to control the first robot to work in the imaging area of the first image capture device and in the imaging area of the second image capture device, and
wherein the second controller is configured to control the second robot to work in the imaging area of the first image capture device and in the imaging area of the second image capture device.

13. The robot system according to claim 12, wherein the first controller is configured to control the first image capture device to capture a stereo image of the to-be-worked material, and the second controller is configured to control the second image capture device to capture another stereo image of the to-be-worked material.

14. The robot system according to claim 1, wherein the second casing accommodates a plurality of tools suitable for the predetermined kinds of work performed on the to-be-worked material.

15. The robot system according to claim 14, further comprising:
a first image capture device disposed in the first casing and configured to capture an image of the to-be-worked material in a first imaging area; and
a second image capture device disposed in the second casing and configured to capture an image of the to-be-worked material in a second imaging area,
wherein the first controller is configured to control the first robot to work in the imaging area of the first image capture device and in the imaging area of the second image capture device, and
wherein the second controller is configured to control the second robot to work in the imaging area of the first image capture device and in the imaging area of the second image capture device.

16. The robot system according to claim 15, wherein the first controller is configured to control the first image capture device to capture a stereo image of the to-be-worked material, and the second controller is configured to control the second image capture device to capture another stereo image of the to-be-worked material.

17. The robot system according to claim 1, further comprising:
a first image capture device disposed in the first casing and configured to capture an image of the to-be-worked material in a first imaging area; and
a second image capture device disposed in the second casing and configured to capture an image of the to-be-worked material in a second imaging area,
wherein the first controller is configured to control the first robot to work in the imaging area of the first image capture device and in the imaging area of the second image capture device, and
wherein the second controller is configured to control the second robot to work in the imaging area of the first image capture device and in the imaging area of the second image capture device.

18. The robot system according to claim 17, wherein the first controller is configured to control the first image capture device to capture a stereo image of the to-be-worked material, and the second controller is configured to control the second image capture device to capture another stereo image of the to-be-worked material.

19. The robot system according to claim 1,
wherein the first side walls include a third wall and a fourth wall facing the third wall,
wherein the second side walls include a fifth wall and a sixth wall facing the fifth wall,
wherein the first robot comprises:
a first base closer to the third wall than to the fourth wall;
at least one first arm; and
at least one first joint configured to couple the at least one first arm to the first base in series and to swing the at least one first arm on a distal end side of the at least one first joint,
wherein the second robot comprise:
a second base closer to the sixth wall than to the fifth wall;
at least one second arm; and
at least one second joint configured to couple the at least one second arm to the second base in series and to swing the at least one second arm on a distal end side of the at least one second joint, and
wherein the first casing and the second casing are disposed adjacent to each other with the third wall of the first casing and the fifth wall of the second casing being next to each other and with the fourth wall of the first casing and the sixth wall of the second casing being next to each other.

20. A method for manufacturing a to-be-worked material using a robot system, the robot system comprising:
a first cell comprising:
a first robot configured to perform a predetermined kind of work on the to-be-worked material within a first movable area;
a first controller configured to control the first robot; and
a first casing including a first bottom wall, first side walls, and a first top wall, a first accommodation space defined by the first bottom wall, the first side walls, and the first top wall accommodating the first robot and the first controller; and a second cell comprising:
- a second robot configured to perform a predetermined kind of work on the to-be-worked material within a second movable area;
- a second controller configured to control the second robot; and
- a second casing including a second bottom wall, second side walls, and a second top wall, a second accommodation space defined by the second bottom wall, the second side walls, and the second top wall accommodating the second robot and the second controller and being connectable to the first casing, the method comprising:

detecting a contact between a first wall of the first side walls and a second wall of the second side walls;

respectively controlling the first robot and the second robot to work in a common operation area using the first controller and the second controller when detecting the contact, the common operation area being where the first movable area and the second movable area overlap;

conveying the to-be-worked material into a work area of at least one robot among the first robot and the second robot;

controlling the at least one robot among the first robot and the second robot to perform the predetermined kind of work on the to-be-worked material; and after controlling the at least one robot among the first robot and the second robot to perform the predetermined kind of work on the to-be-worked material, taking out the to-be-worked material from the work area.

* * * * *